Patented Jan. 12, 1926.

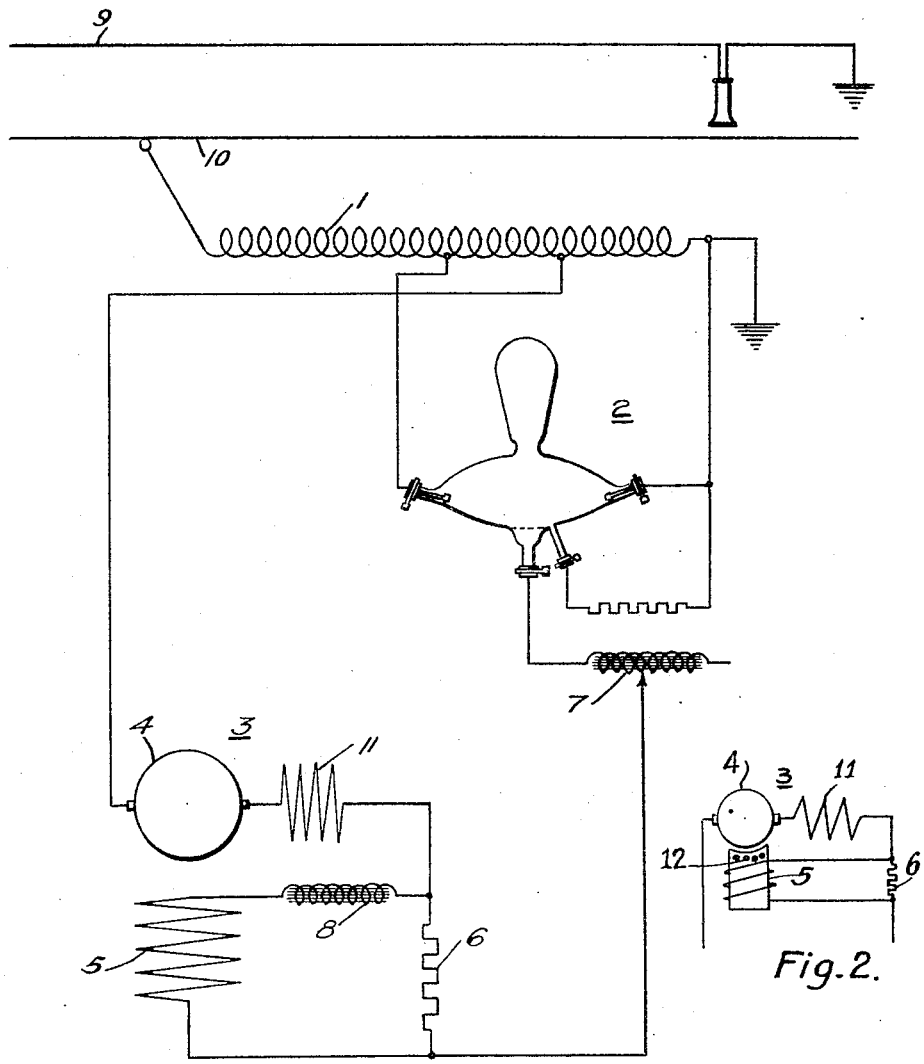

1,569,368

UNITED STATES PATENT OFFICE.

RUDOLF E. HELLMUND, OF PITTSBURGH, PENNSYLVANIA, ASSIGNOR TO WESTINGHOUSE ELECTRIC & MANUFACTURING COMPANY, A CORPORATION OF PENNSYLVANIA.

RECTIFIED-CURRENT COMMUTATOR MOTOR.

Application filed January 5, 1921. Serial No. 435,207.

*To all whom it may concern:*

Be it known that I, RUDOLF E. HELLMUND, a citizen of the United States, and a resident of Swissvale Station, Pittsburgh, in the county of Allegheny and State of Pennsylvania, have invented a new and useful Improvement in Rectified-Current Commutator Motors, of which the following is a specification.

My invention relates to commutator motors for operation on rectified current, and it has special relation to such motors as are adapted for railway work.

It has been found, in connection with rectified current for the operation of direct current motors, that it is necessary to permit the rectified current to vary between zero and a maximum value in order to avoid the telephone disturbance which would otherwise result from the higher harmonic currents attendant upon a smooth rectified current curve. On the other hand, it has been found that the motor field must be kept nearly constant, because otherwise bad sparking conditions are obtained which are similar to those obtaining in alternating current commutator motors if the motor core is laminated, or excessive heating obtains if the motor core is not laminated.

If both half-waves of the alternating-current source are rectified, the rectified current will have a wave-form comprising sinusoidal half-waves all on the same side of the X-axis. Such rectified current may be resolved, by the Fourier series, into a direct-current component, a fundamental alternating-current component, and a number of harmonics of diminishing magnitudes. The alternating components of the rectified currents, known as ripples, are quite objectionable for a number of reasons.

On the other hand, if the ripples just mentioned are smoothed out, as much as possible, by means of very large choke coils, the rectified current will have a wave-form which is substantially a straight line and the corresponding currents drawn from the alternating-current line must, therefore, have a square-top wave-form. Thus, a double-wave rectifier equipped with a large choke coil will not draw sinusoidal current on the alternating-supply line, but will draw square-top currents which may be resolved, by the Fourier series, into a fundamental and a plurality of harmonics. These harmonics may be very objectionable from the standpoint of interference with communication lines parallel to the supply system.

From the foregoing explanation it will be seen that it has heretofore been necessary, practically, to make a choice between harmonics in the direct current or equally objectionable harmonics in the alternating supply currents. The object of the present invention is to provide a pulsating-current motor adapted to operate on a double-wave rectifier in such manner as to eliminate, as far as possible, the objectionable harmonics in the alternating supply currents, and at the same time, to mitigate the harmful effects of ripples in the motor circuits. Heretofore, direct-current motors have been energized by rectified currents through choke coils which were employed to smooth out all the ripples in so far as was possible. If no choke coils were employed, the direct-current component of the pulsating current would be almost entirely neutralized by the back-electromotive force, leaving a very small direct-current electromotive force for driving the currents through the resistances of the windings and circuits. The alternating-current components of the rectified currents are not so neutralized, particularly if a neutralizing winding is employed in the direct-current machine, as will be practically necessary on account of commutation difficulties. Hence, the alternating components may be larger than the unneutralized direct-current component, thus causing the rectified component actually to reverse in direction instead of merely falling substantially to zero and increasing to a maximum value all in the same direction. For that reason I have provided a choke coil which is relatively small compared to the prior-art choke coils and which is, in fact, designed to have such reactance as to cause the currents to fall periodically to zero without reversing in direction.

It is the object of my invention to provide a motor connection for rectified current whereby the current is permitted to pulsate as desired, while the flux is maintained nearly constant.

In the drawing, Fig. 1 is a diagrammatic view of apparatus and circuits embodying my invention, and Fig. 2 is a detailed view showing a modification.

Referring to the accompanying drawing for a more complete understanding of my invention, alternating current is supplied from a transformer coil 1 and fed through a rectifier 2 to a direct-current commutator motor 3. The rectifier 2 may be of any suitable type which rectifies both half-waves of the alternating current, whereby a sinusoidal alternating-current wave-form may be obtained if the rectified current is permitted to fluctuate from zero to a maximum value. The motor 3 is provided with a laminated armature member 4 of usual construction and an exciting field winding 5 which may be mounted upon a field frame having a solid core, as is usual in direct-current machines.

A non-inductive resistor 6 is connected in parallel with the field circuit for the purpose of maintaining the motor field constant. This effect is obtained by reason of the fact that the rectified current, which varies from zero to maximum value, may be divided into a constant current component and an alternating current component. The constant current component divides between the field winding 5 and the resistor 6 in inverse proportion to their respective resistances. The alternating current component, however, encounters considerable inductive impedance in the windings 5 and hence is forced to flow almost entirely through the shunting resistor 6.

By reason of the constant motor field flux, the counter electromotive force will also be constant, and if the impressed electromotive force is pulsating, the current will tend to pulsate to an excessive degree. It is, therefore, necessary to connect an inductance 7 in series with the motor as a whole in order to take up part of the impressed alternating-current component of the voltage. The inductance 7 operates as a source of alternating-current counter electromotive force, and is adjusted to limit the current fluctuations to such degree as to permit the current to vary from zero to a maximum value, as is desirable from a telephone disturbance point of value.

The field variations may be further reduced by having an external inductance 8 in series with the field winding 5, with the resistance 6 connected across the terminals of the inductance 8 and winding 5, as shown. It is understood, of course, that various modifications in the means for preventing inductive interference may be used. In the drawing, this feature of my invention is indicated by means of a telephone wire 9 paralleling the trolley wire 10 which supplies the transformer winding 1. In lieu of the separate inductance 7, I may design the transformer winding 1 to have the necessary equivalent inductance.

From the standpoint of non-inductive interference, my invention comprises the combination with a motor having a nearly constant field, of an inductance device for causing the current to have the desired fluctuation from zero to a maximum value. From this standpoint, a constant field in the motor may, of course, be obtained by means other than that shown, such, for example, as a damping winding 12 around the field poles, as is indicated in Fig. 2. In its broader aspects, therefore, my invention relates to a combination which satisfies the two essential requirements, namely, the elimination of telephone disturbances, and the production of a commercial motor of low cost and high rating.

If desired, my motor may be provided with a neutralizing winding 11, for the purpose of neutralizing the armature inductance to the alternating-current component of the current, and also for the purpose of facilitating commutation. The neutralizing winding may be mounted in the pole faces, or may be mounted, if desired, in a special field frame having a laminated portion and a solid portion, as described in my Patent No. 1,278,924, granted Sept. 17, 1918, and assigned to the Westinghouse Electric & Mfg. Co.

While I have shown my invention in two preferred forms, it is to be understood that it is susceptible of various modifications by those skilled in the art without departing from the spirit and scope thereof, as set forth in the appended claims.

I claim as my invention:—

1. The combination with a source of rectified current, of a motor connected thereto, means for maintaining the field flux of the motor substantially constant, and a reactance device for introducing alternating current counter electromotive forces external to the motor, said alternating current counter electromotive forces being of such value that the motor current may fluctuate substantially from zero to maximum value.

2. The combination with a source of alternating current, of means for rectifying both half-waves of said alternating current, a motor connected to said rectifying means, means for maintaining the field flux of the motor substantially constant, and means for introducing alternating current counter electromotive forces external to the motor, said alternating current counter electromotive forces causing the motor current to fluctuate in such manner as to substantially eliminate undesired harmonics in said alternating current source.

3. The combination with a source of alternating current, of means for rectifying both half-waves of said alternating current, a commutator motor connected to said rectifying means, said motor having a series-connected field winding, a non-inductive resistor shunting said field winding, and means for introducing an alternating current counter electromotive force external to the motor and having such value as to substantially eliminate harmonic currents in said source.

4. The combination with an alternating current supply line, of a rectifier connected thereto, a series commutator motor connected to be energized through said rectifier, means for maintaining the motor field flux constant while permitting the flow of an alternating current component of current through said motor, and means for inducing an alternating current counter electromotive force external to the motor, said induced electromotive force having such value as to substantially eliminate inductive interference in said alternating current supply line.

5. The combination with a source of alternating current, of means for rectifying said current, a unidirectional-current translating device connected to said rectifying means and having a substantially constant generated electromotive force, and a reactance device in series with said translating device, the reactance of said device being of such value as to substantially eliminate undesired harmonics in said alternating current source.

6. The method of translating power between an alternating-current device having a generated electromotive force of substantially sinusoidal wave-form and a direct-current device having a substantially constant unidirectional generated electromotive force, which comprises introducing an alternating electromotive force in the direct-current circuit to cause the direct current to vary cyclically from substantially zero to a maximum value.

7. The combination with an alternating-current device having a generated electromotive force of substantially sinusoidal wave-form and a direct-current device having a substantially constant uni-directional generated electromotive force, of means for translating power therebetween comprising means for introducing into the direct-current circuit an alternating electromotive force of such value as to cause the direct current to vary cyclically from substantially zero to a maximum value.

In testimony whereof, I have hereunto subscribed my name this 27th day of December 1920.

RUDOLF E. HELLMUND.